Figure 1:
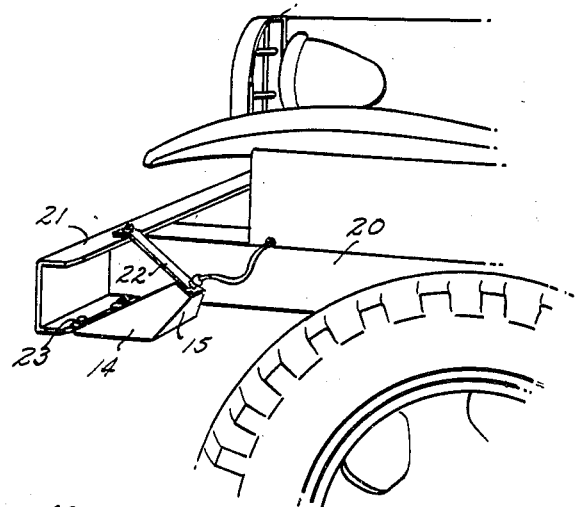

July 27, 1943.  H. W. BARNES  2,325,216
BLACKOUT LAMP
Filed March 9, 1942

INVENTOR.,
Harry W. Barnes,
BY Robert M. Fulwider
ATTORNEY.

Patented July 27, 1943

2,325,216

UNITED STATES PATENT OFFICE 2,325,216

BLACK-OUT LAMP

Harry W. Barnes, Beverly Hills, Calif.

Application March 9, 1942, Serial No. 433,903

1 Claim. (Cl. 240—7.1)

My invention relates generally to lamps adapted to direct light in a manner such that it will sufficiently illuminate a particular area without being visible to unauthorized persons, and more particularly to a lamp of this character which can be installed on the forward portion of a vehicle so that sufficient light will be available for driving purposes without the light being visible at any distance from the vehicle.

There are many instances, particularly in modern warfare, where it is absolutely essential to be able to operate a motor vehicle in complete darkness and with a certain degree of rapidity. In some instances, the travel will have to be over rough terrain not previously traveled, but in most cases it will be over a road or some other route previously traveled. If the road is well defined, the driver can successfully guide his vehicle if he is able to see the edge of the road; or in the case of a highway, the center stripe, or in other instances, by following ruts in the road. If there is no danger of meeting other vehicles traveling from the opposite direction, a relatively small amount of light suffices to guide the driver if it is properly placed.

Army maneuvers and civilian experience during blackouts have both demonstrated that it is necessary for moving vehicles to have some light in order to operate without damage to the equipment and loss of life. It has further been demonstrated that blue light, while not visible at such a great distance as white light, is completely unsatisfactory for army maneuvers during blackout conditions. It has likewise been proven that the so-called cat's eye type of headlight is in many instances visible for a considerable distance, and in many cases enables the enemy to successfully locate moving vehicles which are supposed to be traveling in secrecy.

The major object of my invention is to provide a lamp which can be satisfactorily used during blackout conditions and which will be simple to manufacture and easy to install. The lamp disclosed and claimed herein has successfully demonstrated its value under blackout conditions and has been found to give adequate light for normal troup movement without the light being visible more than a short distance from its source.

Another advantage of the light which I have developed is that it does not light up the clouds of dust often raised by the movement of vehicles on dusty roads, and for that reason can be used very close to enemy positions without discovery.

It is also an object of my invention to provide a vehicle lamp which projects a spot of variable intensity whereby any noticeable line of division between light and shadow is eliminated.

Another feature of my invention resides in the fact that the amount of light available for use may be easily and quickly varied to suit changing conditions.

Figure 2:
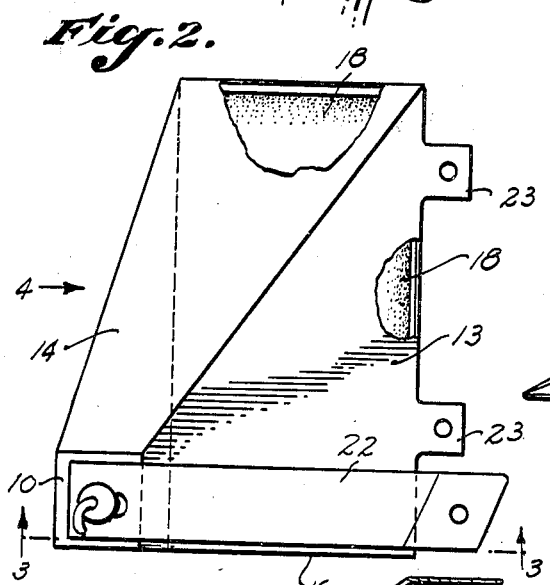
Figure 4:
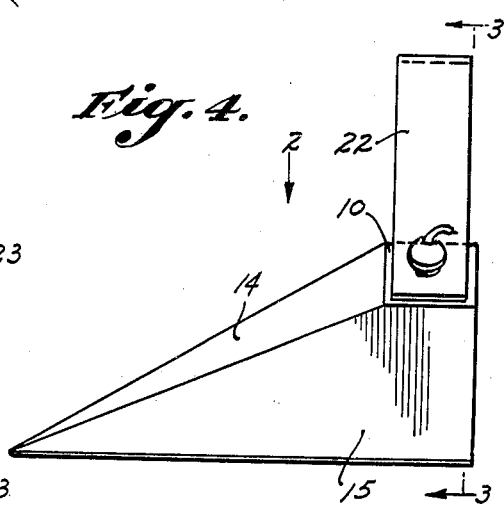
Figure 3:
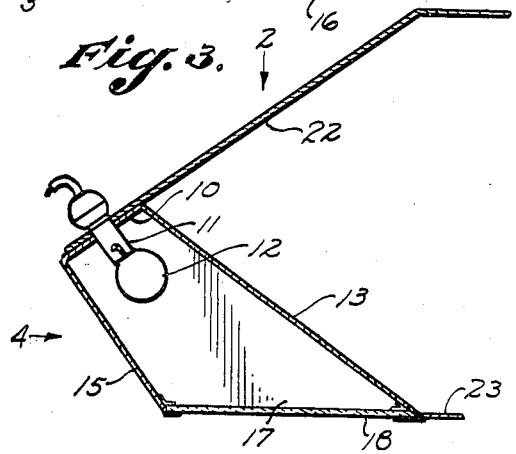

These and other objects and advantages of my invention will become apparent from the following description of a preferred form thereof together with the accompanying drawing, in which:

Fig. 1 is a perspective view of a blackout lamp attached to the forward portion of an army truck, Fig. 2 is a top plan of said lamp, Fig. 3 is a side elevational section, and Fig. 4 is a rear elevation of the lamp.

Referring now to the drawing and particularly to Fig. 2 thereof, the numeral 10 indicates the base of a hood, through which a lamp socket 11 extends which is adapted to support an electric bulb 12 within the hood. In this form of my invention, the lamp housing or hood is shaped generally as the frustum of a pyramid, although it will be understood of course that variations in this shape are possible without changing the function. Extending forwardly and downwardly from the base 10 is a forward wall 13 and a side wall 14 which make a substantial angle with the horizontal when the lamp is in operative position as shown. A rear wall 15 and a side wall 16 also extend forwardly and downwardly from the base 10 at right angles to each other. The forward wall 13 and the first-mentioned side wall 14 each flare outwardly as indicated to give an enlarged opening or aperture 17 which is disposed in a substantially horizontal plane.

While the hood formed by the walls 13, 14, 15 and 16 may of course vary considerably in size and shape, the lamp 12 must at all times be placed back of the aperture 17, so that no direct rays of light from the bulb will be visible except from a position directly below the lamp, and all rays reflected from the hood walls at a positive angle to the horizontal will be lost. In other words, with the lamp mounted so that the aperture 17 is substantially horizontal, the bulb and hood are so proportioned and related to each other that all light rays emanating therefrom make a negative angle with the horizontal plane, i. e. are directed downwardly from the source. As a consequence, no direct light is visible to anyone not immediately below the lamp, and when the lamp is mounted relatively close to the ground, as for example behind the bumper of a vehicle, as illustrated in Fig. 1, it will be impossible for anyone to detect any direct rays from the lamp whatsoever at a distance of more than a very few feet from the lamp, and then only if he lies on the ground.

Referring to Fig. 1, the numeral 20 indicates a portion of the frame of a vehicle to which a bumper 21 is mounted in conventional manner. An angle bracket 22 is attached to the base 10 of the lamp and its other end is attached to the bumper 21 as indicated, thus suspending the lamp behind and even with the bottom of the bumper so that the light therefrom will be directed onto the road to the left of and slightly forward of the front wheel. Ears 23 may also be provided on the forward edge of forward wall 13 adapted to be clamped on the bottom portion of the bumper. It will be understood, of course, that any number of the lamps can be mounted on the vehicle, and consequently in Fig. 1 I have only shown one of the lamps as illustrative of what can be done. With the lamp mounted in the manner described, it will be apparent that the light will be directed a slight distance forward and to the side of the vehicle and will illuminate ruts in the road or the center stripe of the highway if there be one. On the other hand, since all of the rays are directed downwardly at a negative angle to the horizontal, the rays will not be visible to anyone away from the road, and by having the total volume of light relatively small, the amount of light reflected from the highway will not be sufficient to be visible at a distance. Care should also be taken of course to mount the lamp so that no light rays therefrom will strike any part of the vehicle and be reflected therefrom.

The bulbs 12 are of course connected to any convenient source of electric power and the circuit is provided with a rheostat preferably located in the driver's compartment so that he can vary the amount of illumination at will, depending upon driving conditions. As previously mentioned, I have found that with a relatively small bulb, such for example as is ordinarily used in automobile headlights, and by reducing the current flowing therethrough, I can sufficiently illuminate a road to allow successful operation of a truck without the light being visible more than a few yards away even though a considerable cloud of dust is raised. Where a number of trucks are being moved together in single file, it is relatively easy for them to keep their proper distance and to see enough of the road to drive without danger.

If desired, the inner faces of the walls of the lamp may be made reflecting to get the most efficiency out of a given size of bulb, but I have found that even a dull white finish on the inside of the housing is sufficient with an ordinary lamp. Likewise, a protective glass or other transparent plate or lens may be located in the aperture 17 to protect the interior of the housing from dirt and possible damage from underbrush. In this connection I have found that a much more satisfactory light is produced if a plate having a graduated density is used adjacent the hood aperture. Experiments have indicated that any sharp definition between the lighted and unlighted portions of the ground is objectionable, and that this can be eliminated by using a plate whose light transmissive properties decrease toward the edges thereof. Such a plate is illustrated in the drawing by the numeral 18, and from Fig. 2 it will be seen that it varies from full transparency at the center to near opacity at the edges.

From the foregoing, it will be apparent that I have provided a blackout lamp that is both simple and economical to construct and install and one which can be used under the most stringent conditions. It is to be understood of course that the form shown and described herein is merely illustrative of a preferred form of my invention and that various modifications may be made therein in order to meet particular problems, without departing from the scope of my invention as defined in the appended claim.

I claim:

The combination with a vehicle having a front bumper of channel-shape arranged with its lateral flanges directed rearwardly, a lamp-housing of frusto-pyramidal form having a light transmissive base extending in a horizontal plane and an opposite top-plate directed at a forwardly diverging angle thereto, converging side walls, the front and rear walls being inclined forwardly at diverging angles, a bracket secured to said top-plate and extending in substantially the same plane for rigid connection with the upper flange of said bumper, ears extending from said front wall rigidly connected to the lower flange of said bumper, and a lamp mounted in said housing adjacent its upper end whereby all rays of light issuing from said housing will be cast downwardly through said base.

HARRY W. BARNES.